(12) United States Patent
Konik et al.

(10) Patent No.: US 8,392,374 B2
(45) Date of Patent: Mar. 5, 2013

(54) DISPLAYING HIDDEN ROWS IN A DATABASE AFTER AN EXPIRATION DATE

(75) Inventors: Rafal P. Konik, Oronoco, MN (US); Mark W. Theuer, Rochester, MN (US); Michael A. Venz, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 132 days.

(21) Appl. No.: 12/871,113

(22) Filed: Aug. 30, 2010

(65) Prior Publication Data
US 2012/0054223 A1 Mar. 1, 2012

(51) Int. Cl.
*G06F 7/00* (2006.01)
*G06F 17/00* (2006.01)

(52) U.S. Cl. ........................ 707/662; 707/769; 707/802

(58) Field of Classification Search .................. 707/662, 707/663, 666, 689, E17.044, 999.01, 769, 707/802, E17.005, E17.014
See application file for complete search history.

(56) References Cited

U.S. PATENT DOCUMENTS

| | | | | |
|---|---|---|---|---|
| 5,523,942 A | * | 6/1996 | Tyler et al. ..................... 715/255 |
| 5,882,202 A | * | 3/1999 | Sameth et al. ................. 715/201 |
| 6,189,010 B1 | * | 2/2001 | Isip, Jr. ...................... 707/999.1 |
| 6,768,985 B1 | * | 7/2004 | Plasek et al. ............... 707/999.1 |
| 7,624,052 B1 | * | 11/2009 | Seaman et al. .................. 705/35 |
| 8,108,367 B2 | * | 1/2012 | Konik et al. .................. 707/694 |
| 2004/0128169 A1 | * | 7/2004 | Lusen ............................... 705/3 |
| 2006/0022048 A1 | * | 2/2006 | Johnson ..................... 235/462.1 |
| 2006/0206487 A1 | | 9/2006 | Harada et al. |
| 2008/0104091 A1 | * | 5/2008 | Chin ............................ 707/100 |
| 2009/0077383 A1 | * | 3/2009 | de Monseignat et al. ..... 713/175 |
| 2009/0292711 A1 | * | 11/2009 | Konik et al. .......... 707/E17.044 |
| 2010/0077288 A1 | * | 3/2010 | Adi et al. ....................... 715/221 |

OTHER PUBLICATIONS

Rick F. van der Lans—"The SQL Guide to Ingres"—First Lulu edition 2009, Uploaded Sep. 2009, ISBN: 978-0-557-07043-5—from R van der Lans—database, 2009—r20.nl—(pp. 1-96).*
Matthew MacDonald, Dan Mabbutt and Adam Freeman—"Caching and Asynchronous Pages"—Professional and Applied Computing, Pro ASP.NET 4 in VB 2010, 2010, Part II, (pp. 475-525).*

* cited by examiner

*Primary Examiner* — Anh Ly
(74) *Attorney, Agent, or Firm* — Owen J. Gamon (57) ABSTRACT

In an embodiment, a first row of data is stored in a database. The first row of data is hidden until a current date is later than a hidden expiration date. An indication is returned, to a requestor, that the first row does not exist in response to a query from the requestor that specifies a key that identifies the first row if the current date is before the hidden expiration date. The first row is returned, to the requestor, in response to the query if the current date is after the hidden expiration date.

11 Claims, 6 Drawing Sheets

DISPLAYING HIDDEN ROWS IN A DATABASE AFTER AN EXPIRATION DATE

FIELD

An embodiment of the invention generally relates to computer systems and more particularly to displaying hidden rows in a database after an expiration date.

BACKGROUND

Computer systems typically include a combination of hardware (such as semiconductors, circuit boards, processors, and storage devices) and computer programs that are stored in the hardware and that are executed by the processors. Fundamentally, computer systems are used for the storage, manipulation, and analysis of data. One mechanism for managing data is called a database management system, which may also be called a database system or simply a database.

One type of database is called a relational database, which organizes data into tables that have rows, which represent individual entries, tuples, or records in the database, and columns, fields, or attributes, which define the organization or structure of the data that is stored in each row, entry, tuple, or record. Each table has a unique name within the database and each column has a unique name within the particular table. The relational database also has an index, which is a data structure that identifies the location of a certain row in a table given an indexed column value, analogous to a book index informing the reader on which page a given word appears.

The power of the relational database flows from the fact that the relational database model uses a mathematical representation for its data, where relationships exist within the data, but the data itself is not tied to any particular view of the data or method of accessing the data. Thus, accessing the data does not rely on any built-in navigational information within the data itself, and the actions, procedures, or modules that access the data are separate from the data. Thus, the relational data may be freely indexed, queried, and accessed as a whole.

Users sometimes want to insert data into a database without allowing others the ability to read the data. Such data are referred to as hidden records. For example, some data is classified or contains extraneous information, which needs to be removed before being made available for general viewing. Such classified or extraneous information may include identifying information, such as names, account numbers, teller or clerk numbers.

SUMMARY

A method, computer-readable storage medium, and computer system are provided. In an embodiment, a first row of data is stored in a database. The first row of data is hidden until a current date is later than a hidden expiration date. An indication is returned, to a requestor, that the first row does not exist in response to a query from the requestor that specifies a key that identifies the first row if the current date is before the hidden expiration date. The first row is returned, to the requestor, in response to the query if the current date is after the hidden expiration date.

It is to be noted, however, that the appended drawings illustrate only example embodiments of the invention, and are therefore not considered a limitation of the scope of other embodiments of the invention.

DETAILED DESCRIPTION

Figure 1:
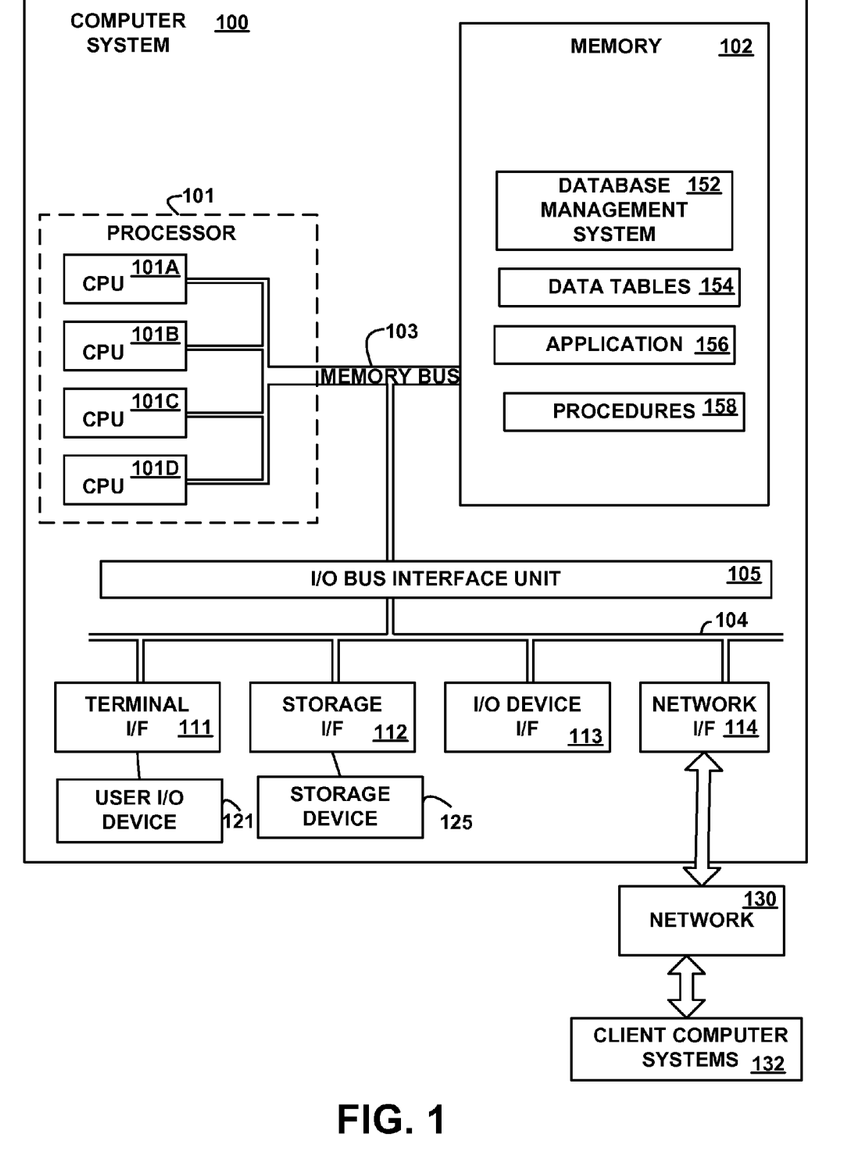
FIG. 1 depicts a high-level block diagram of an example system for implementing an embodiment of the invention.

Referring to the Drawings, wherein like numbers denote like parts throughout the several views, FIG. 1 depicts a high-level block diagram representation of a server computer system 100 connected to client computer systems 132 via a network 130, according to an embodiment of the invention. In various embodiments, a computer system that acts as a server in one scenario may act as a client in another scenario, and vice versa. The major components of the computer system 100 include one or more processors 101, memory 102, a terminal interface unit 111, a storage interface unit 112, an I/O (Input/Output) device interface unit 113, and a network adapter 114, all of which are communicatively coupled, directly or indirectly, for inter-component communication via a memory bus 103, an I/O bus 104, and an I/O bus interface unit 105.

The processor 101 comprises one or more general-purpose programmable central processing units (CPUs) 101A, 101B, 101C, and 101D. In an embodiment, the computer system 100 contains multiple processors typical of a relatively large system; however, in another embodiment the computer system 100 may alternatively be a single processor system. The CPUs 101A, 101B, 101C, and 101D execute instructions stored in the memory 102.

The memory 102 may be a random-access semiconductor memory, storage device, or storage medium for storing or encoding data and programs. In another embodiment, the memory 102 may represent the entire virtual memory of the computer system 100, and may also include the virtual memory of other computer systems coupled to the computer system 100 or connected via the network 130. The memory 102 is conceptually a single monolithic entity, but in other embodiments the memory 102 is a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures.

The memory 102 stores or encodes a database management system 152, data tables 154, an application 156, and procedures 158. Although the database management system 152, the data tables 154, the application 156, and the procedures 158 are illustrated as being contained within the memory 102 in the computer system 100, in other embodiments some or all of them may be on different computer systems (e.g., the client computer systems 132) and may be accessed remotely, e.g., via the network 130. The computer system 100 may use virtual addressing mechanisms that allow the programs of the computer system 100 to behave as if they only have access to a large, single storage entity instead of access to multiple, smaller storage entities. Thus, while the database management system 152, the data tables 154, the application 156, and the procedures 158 are illustrated as being contained within the memory 102, these elements are not necessarily all completely contained in the same storage device at the same time. Further, although the database management system 152, the data tables 154, the application 156, and the procedures 158 are illustrated as being separate entities, in other embodiments some of them, portions of some of them, or all of them may be packaged together.

In various embodiments, the database management system 152, the application 156, and the procedures 158 comprise programs, functions, methods, procedures, routines, classes, objects, instructions, or statements that execute on the processor 101 or that are interpreted by instructions or statements that execute on the processor 101, or that are compiled into instructions that execute on the processor 101, to carry out the functions as further described below with reference to FIGS. 2, 3, 4, 5, and 6. In other embodiments, some or all of the database management system 152, the application 156, and the procedures 158 are implemented in hardware via semiconductor devices, chips, logical gates, circuits, circuit cards, and/or other physical hardware devices in lieu of, or in addition to, a processor-based system.

In various embodiments, the application 156 and the procedures 158 may be implemented as user applications, third-party applications, an operating system, functions or operations, or any portion, multiple, or combination thereof.

The memory bus 103 provides a data communication path for transferring data between the processor 101, the memory 102, and the I/O bus interface unit 105. The I/O bus interface unit 105 is further coupled to the system I/O bus 104 for transferring data to and from the various I/O units. The I/O bus interface unit 105 communicates with multiple I/O interface units 111, 112, 113, and 114, which are also known as I/O processors (IOPs) or I/O adapters (IOAs), through the system I/O bus 104.

The I/O interface units support communication with a variety of storage and I/O devices. For example, the terminal interface unit 111 supports the attachment of one or more user input/output devices 121, which may include user output devices (such as a video display device, speaker, printer, and/or television set) and user input devices (such as a keyboard, mouse, keypad, touchpad, trackball, buttons, light pen, or other pointing device). A user may manipulate the user input devices, in order to provide input to the user input/output device 121 and the computer system 100 via a user interface, and may receive output via the user output devices. For example, a user interface may be presented via the user input/output device 121, such as displayed on a display device, played via a speaker, or printed via a printer.

The storage interface unit 112 supports the attachment of one or more storage devices 125 (which are typically rotating magnetic disk drive storage devices, although they could alternatively be other devices, including arrays of disk drives configured to appear as a single large storage device to a host). In another embodiment, the storage devices 125 may be implemented via any type of secondary storage device. The contents of the memory 102, or any portion thereof, may be stored to and retrieved from the storage devices 125, as needed.

The I/O device interface 113 provides an interface to any of various other input/output devices or devices of other types, such as printers or fax machines. The network adapter 114 provides one or more communications paths from the computer system 100 to other digital devices and computer systems; such paths may include, e.g., one or more networks 130.

Although the memory bus 103 is shown in FIG. 1 as a relatively simple, single bus structure providing a direct communication path between the processors 101, the memory 102, and the I/O bus interface unit 105, in fact the memory bus 103 may comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 105 and the I/O bus 104 are shown as single respective units, the computer system 100 may, in fact, contain multiple I/O bus interface units 105 and/or multiple I/O buses 104. While multiple I/O interface units are shown, which separate the system I/O bus 104 from various communications paths running to the various I/O devices, in other embodiments some or all of the I/O devices are connected directly to one or more system I/O buses.

In various embodiments, the computer system 100 may be a multi-user mainframe computer system, a single-user system, or a server or similar device that has little or no direct user interface, but receives requests from other computer systems (clients). In other embodiments, the computer system 100 may be implemented as a desktop computer, portable computer, laptop or notebook computer, tablet computer, pocket computer, telephone, pager, automobile, teleconferencing system, appliance, or any other appropriate type of electronic device.

The network 130 may be any suitable network or combination of networks and may support any appropriate protocol suitable for communication of data and/or code to/from the computer system 100. In various embodiments, the network 130 may represent a storage device or a combination of storage devices, either connected directly or indirectly to the computer system 100. In an embodiment, the network 130 may support wireless communications. In another embodiment, the network 130 may support hard-wired communications, such as a telephone line or cable. In an embodiment, the network 130 may be the Internet and may support IP (Internet Protocol). In various embodiments, the network 130 may be a local area network (LAN), a wide area network (WAN), a hotspot service provider network, an intranet, a GPRS (General Packet Radio Service) network, a FRS (Family Radio Service) network, a cellular data network, or a cell-based radio network. Although one network 130 is shown, in other embodiments any number of networks (of the same or different types) may be present.

The client computer systems 132 may comprise various combinations of some or all of the hardware and program components of the computer system 100.

FIG. 1 is intended to depict the representative major components of the computer system 100, the network 130, and the client computer systems 132. But, individual components may have greater complexity than represented in FIG. 1, components other than or in addition to those shown in FIG. 1 may be present, and the number, type, and configuration of such components may vary. Several particular examples of such additional complexity or additional variations are disclosed herein; these are by way of example only and are not necessarily the only such variations.

The various program components illustrated in FIG. 1 and implementing various embodiments of the invention may be implemented in a number of manners, including using various computer applications, routines, components, programs, objects, modules, data structures, etc., and are referred to hereinafter as "computer programs," or simply "programs." The computer programs comprise one or more instructions or statements that are resident at various times in various memory and storage devices in the computer system 100 and that, when read and executed by one or more processors in the computer system 100 or when interpreted by instructions that are executed by one or more processors, cause the computer system 100 to perform the actions necessary to execute steps or elements comprising the various aspects of embodiments of the invention.

Aspects of embodiments of the invention may be embodied as a system, method, or computer program product. Accordingly, aspects of embodiments of the invention may take the form of an entirely hardware embodiment, an entirely program embodiment (including firmware, resident programs, micro-code, etc., which are stored in a storage device) or an embodiment combining program and hardware aspects that may all generally be referred to herein as a "circuit," "module," or "system." Further, embodiments of the invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium, may be, for example, but not limited to, an electronic, magnetic, optical, electromagnetic, infrared, or semiconductor system, apparatus, or device, or any suitable combination of the foregoing. More specific examples (an non-exhaustive list) of the computer-readable storage media may comprise: an electrical connection having one or more wires, a portable computer diskette, a hard disk (e.g., the storage device 125), a random access memory (RAM) (e.g., the memory 102), a read-only memory (ROM), an erasable programmable read-only memory (EPROM) or Flash memory, an optical fiber, a portable compact disc read-only memory (CD-ROM), an optical storage device, a magnetic storage device, or any suitable combination of the foregoing. In the context of this document, a computer-readable storage medium may be any tangible medium that can contain, or store, a program for use by or in connection with an instruction execution system, apparatus, or device.

A computer-readable signal medium may comprise a propagated data signal with computer-readable program code embodied thereon, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that communicates, propagates, or transports a program for use by, or in connection with, an instruction execution system, apparatus, or device. Program code embodied on a computer-readable medium may be transmitted using any appropriate medium, including but not limited to, wireless, wire line, optical fiber cable, Radio Frequency (RF), or any suitable combination of the foregoing.

Computer program code for carrying out operations for aspects of embodiments of the present invention may be written in any combination of one or more programming languages, including object oriented programming languages and conventional procedural programming languages. The program code may execute entirely on the user's computer, partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of embodiments of the present invention are described below with reference to flowchart illustrations and/or block diagrams of methods, apparatus (systems), and computer program products. Each block of the flowchart illustrations and/or block diagrams, and combinations of blocks in the flowchart illustrations and/or block diagrams may be implemented by computer program instructions embodied in a computer-readable medium. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified by the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture, including instructions that implement the function/act specified by the flowchart and/or block diagram block or blocks. The computer programs defining the functions of various embodiments of the invention may be delivered to a computer system via a variety of tangible computer-readable storage media that may be operatively or communicatively connected (directly or indirectly) to the processor or processors. The computer program instructions may also be loaded onto a computer, other programmable data processing apparatus, or other devices to cause a series of operational steps to be performed on the computer, other programmable apparatus, or other devices to produce a computer-implemented process, such that the instructions, which execute on the computer or other programmable apparatus, provide processes for implementing the functions/acts specified in the flowcharts and/or block diagram block or blocks.

The flowchart and the block diagrams in the figures illustrate the architecture, functionality, and operation of possible implementations of systems, methods, and computer program products, according to various embodiments of the present invention. In this regard, each block in the flowcharts or block diagrams may represent a module, segment, or portion of code, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Each block of the block diagrams and/or flowchart illustration, and combinations of blocks in the block diagrams and/or flow chart illustrations, can be implemented by special purpose hardware-based systems that perform the specified functions or acts, in combinations of special purpose hardware and computer instructions.

Embodiments of the present invention may also be delivered as part of a service engagement with a client corporation, nonprofit organization, government entity, or internal organizational structure. Aspects of these embodiments may comprise configuring a computer system to perform, and deploying computing services (e.g., computer-readable code, hardware, and web services) that implement, some or all of the methods described herein. Aspects of these embodiments may also comprise analyzing the client company, creating recommendations responsive to the analysis, generating computer-readable code to implement portions of the recommendations, integrating the computer-readable code into existing processes, computer systems, and computing infrastructure, metering use of the methods and systems described herein, allocating expenses to users, and billing users for their use of these methods and systems. In addition, various programs described hereinafter may be identified based upon the application for which they are implemented in a specific embodiment of the invention. But, any particular program nomenclature that follows is used merely for convenience, and thus embodiments of the invention are not limited to use solely in any specific application identified and/or implied by such nomenclature.

The exemplary environments illustrated in FIG. 1 are not intended to limit the present invention. Indeed, other alternative hardware and/or program environments may be used without departing from the scope of embodiments the invention.

Figure 2:
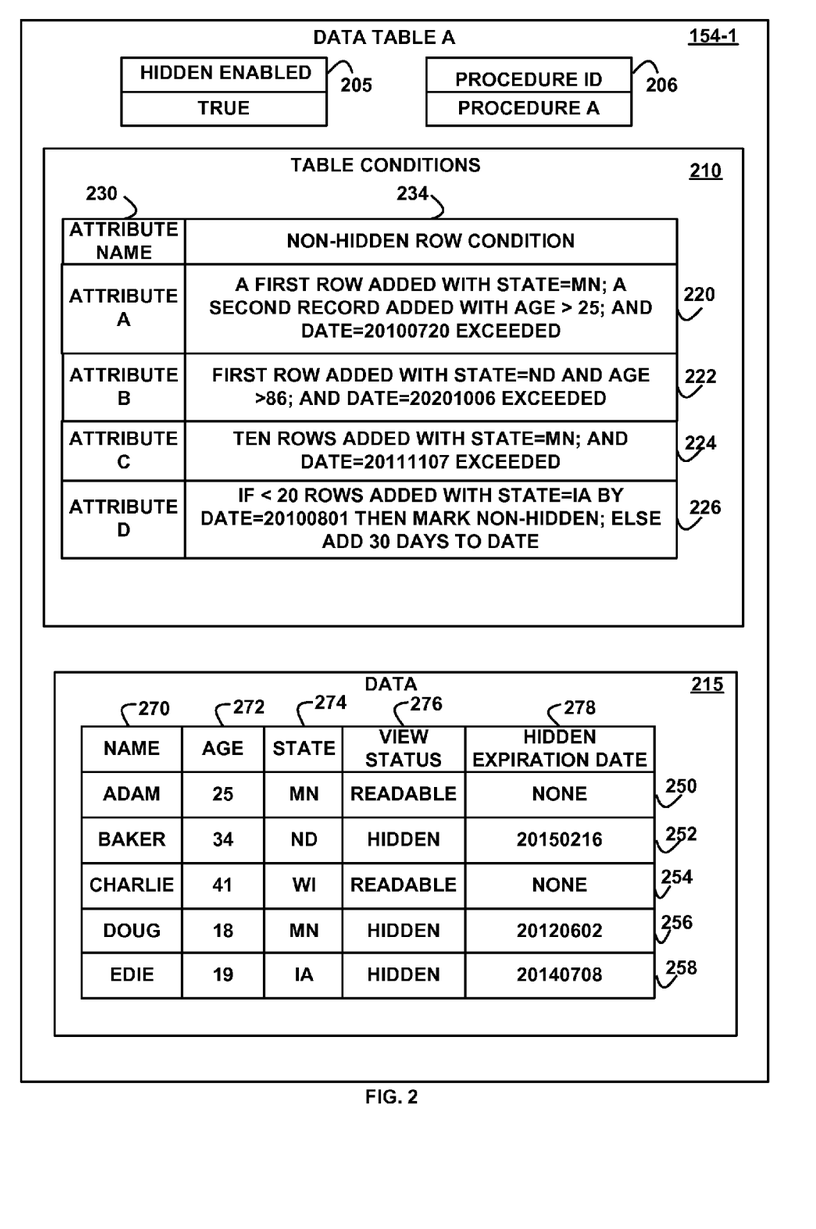
FIG. 2 depicts a block diagram of an example data table, according to an embodiment of the invention.

FIG. 2 depicts a block diagram of an example data table 154-1, according to an embodiment of the invention. The example data table 154-1 is an example of, and is generically referred to by, the data table 154 (FIG. 1). A database may comprise any number of data tables. The example data table 154-1 comprises a hidden enabled field 205, a procedure identifier field 206, table conditions 210, and data 215. The hidden enabled field 205 indicates whether or not the database management system 152 allows hidden rows to be added to the data 215. If the hidden enabled field indicates true, then the database management system 152 allows hidden rows to be added to the data 215. If the hidden enabled field indicates false, then the database management system 152 does not allow hidden rows to be added to the data 215. Hidden rows in the table 154-1 are rows that the database management system 152 does not return or provide in response to queries or searches that identify the hidden rows.

The procedure identifier field 206 identifies a procedure in the procedures 158. In an embodiment, the database management system 152 invokes the procedure identified by the procedure identifier 206, in order to determine whether a row is hidden or viewable. The database management system 152 may pass to the procedure an identifier of a row, rows, and/or any other information. In an embodiment, the procedure evaluates the non-hidden row conditions 234, determines whether or not the non-hidden row conditions 234 are satisfied or met, and returns a value that indicates true/false or hidden/viewable, indicating whether or not the passed row is allowed to be viewed or is to remain hidden.

The table conditions 210 comprises example records 220, 222, 224, and 226, each of which comprises an example attribute name field 230 and an example non-hidden row condition field 234. The attribute name field 230 in each record names or identifies the non-hidden row condition 234 in the same record. The non-hidden row condition 234 specifies the condition or criteria that if evaluated to true, causes a row in the data 215 that has a view status that indicates that the row is hidden to change its view status to indicate that the row is readable or not hidden. In various embodiments, the table conditions 210 apply to all rows in the data 215 or to rows specified by the table conditions 210. The non-hidden row condition 234 may also specify an action that the database management system 152 takes in response to the non-hidden row condition 234 evaluating to true.

In various embodiments, the non-hidden row condition 234 specifies that a first row with a first key is hidden until the current date is later than a hidden expiration date and a second row with a second key is added or updated (to a same table as the first row or a different table than the first row). In various embodiments, the second row is any row that is updated, any row that is updated to include a key specified by the non-hidden row condition 234, or any row that originally had a key specified by the non-hidden row condition 234 and is updated to any other key or another key specified by the non-hidden row condition 234. If the second row with the second key is not added, then the first row remains hidden after the current date is past the hidden expiration date.

In various embodiments the non-hidden row condition 234 specifies that if a first row with a first key specified by the condition is added with a hidden expiration date and a second key specified by the non-hidden row condition 234 already exists in the database (in the same or a different table as the first row) in a second row at the date the first row is added, then the first row is no longer hidden after the current date is later than the hidden expiration date. But, if the second row with the specified second key is not pre-existing in the database at the date that the first row is added, then the first row remains hidden after the hidden expiration date.

In various embodiments the non-hidden row condition 234 specifies that if a number of rows with a first key are added before a first date, then all of those rows (or all rows with the first key or with a second key) are changed to non-hidden after the current date exceeds the hidden expiration date. If the number of rows are not added before the first date, then the rows are not changed to non-hidden after the hidden expiration date and/or the first date is optionally changed.

In various embodiments, the non-hidden row conditions 234, the number of rows, the keys, and the dates are specified by the table conditions 210, specified by the user that adds the hidden rows, are selected by the database management system 152, are specified by a database administrator, or are supplied by invocation of the procedure identified by the procedure identifier 206. The names "first row" and "second row" are labels used for clarity to distinguish between rows.

In various embodiments, the non-hidden row conditions 234 specify any multiple, and/or combination of: data columns, fields, or keys (which may specify columns and values to be compared against the content of column fields in rows); functions, calls, invocations of the procedure 206, methods, classes, or applets; relational operators (e.g., greater than, less than, equal to, not equal to, greater than or equal to, less than or equal to, or any other relational operator); logical operators (e.g., AND, OR, XOR, NOT, NOR, NAND, or any other logical operator); arithmetic operators (e.g., multiplication, division, addition, subtraction, bases, powers, logarithms, or any other arithmetic operators); register operations (e.g., shift left, shift right operations, or any other register operation); and the relational operators, the logical operators, the arithmetic operators, and the register operations may have any number of arguments or operands (e.g., they may be unary, binary, ternary, or n-ary).

The example data 215 is organized into rows 250, 252, 254, 256, and 258, each of which represent individual rows, entries, tuples, or records in a database. Each of the rows 250, 252, 254, 256, and 258 comprises example columns, keys, fields, or attributes 270, 272, 274, 276, and 276, which define the organization or structure of the data values that are stored in each row.

Each data table 154-1 has a unique identifier or name within the database and each column has a unique identifier or name within the particular table. The example columns comprise a name column 270, an age column 272, a state column 274, a view status column 276, and a hidden expiration column 278.

The view status column 276 indicates, for each row, whether that row is readable or hidden and not readable. The hidden expiration date field 278 indicates, for each row, the date that the database management system 152 conditionally changes the view status 276 from hidden to readable for that row. In various embodiments, the hidden expiration date field 278 specifies a date, time, a timestamp, a calendar date, a civil calendar date, a Gregorian date, a Julian date, a year, a month, a day of a month, a day of a week, an hour, a minute, a second, or any portion or combination thereof.

Figure 3:
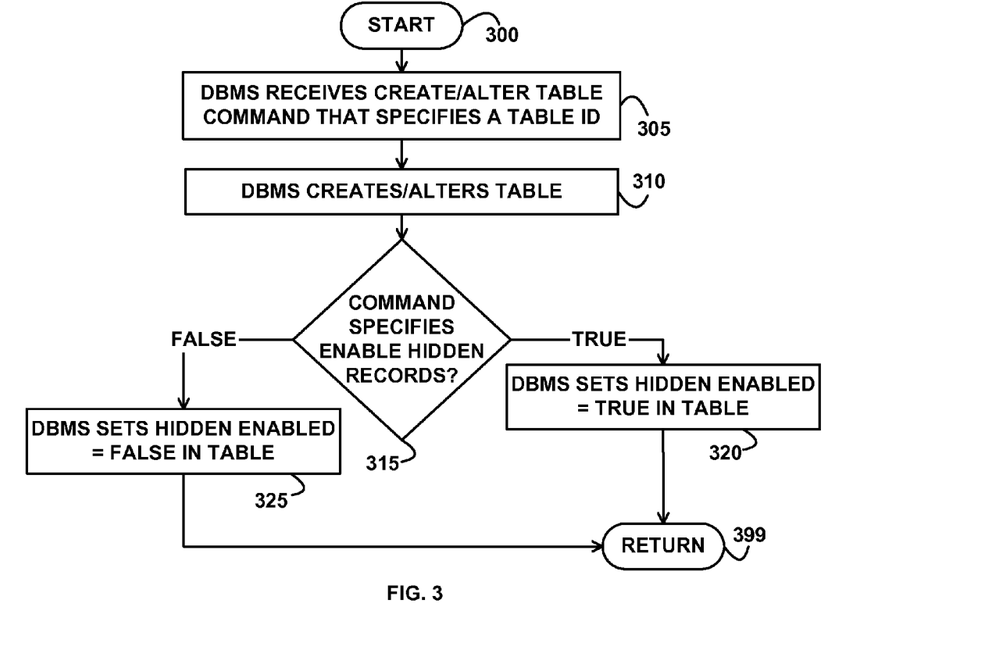
FIG. 3 depicts a flowchart of example processing for creating/altering a table, according to an embodiment of the invention.

FIG. 3 depicts a flowchart of example processing for creating/altering a table, according to an embodiment of the invention. Control begins at block 300. Control then continues to block 305 where the database management system 152 receives a create or alter table command that specifies an identifier of a table from a requestor, such as the application 156. Control then continues to block 310 where the database management system 152 creates or alters the table identified by the table identifier.

Control then continues to block 315 where the database management system 152 determines whether the received create or alter command specifies the enable hidden rows option. If the determination at block 315 is true, then the received command specifies the enable hidden rows option, so control continues to block 320 where the database management system 152 sets the hidden enabled field 295 in the table identified by the table identifier to indicate true. Control then continues to block 399 where the logic of FIG. 3 returns.

If the determination at block 315 is false, then the received command does not specify the enable hidden rows option, so control continues to block 325 where the database management system 152 sets the hidden enabled field 295 in the table identified by the table identifier to indicate false. Control then continues to block 399 where the logic of FIG. 3 returns.

Figure 4:
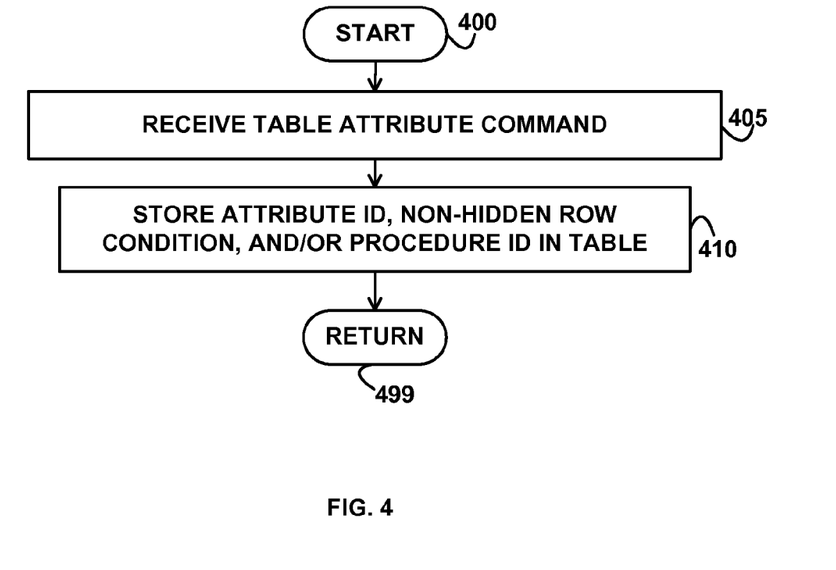
FIG. 4 depicts a flowchart of example processing for a table attribute command, according to an embodiment of the invention.

FIG. 4 depicts a flowchart of example processing for a table attribute command, according to an embodiment of the invention. Control begins at block 400. Control then continues to block 405 where the database management system 152 receives a table attribute command that specifies a table identifier, an attribute identifier, a non-hidden row condition, and/or a procedure identifier from an application 156. Control then continues to block 410 where the database management system 152 finds the table identified by the table identifier. The database management system 152 then stores, into an entry in the table conditions 210 of that table, the received attribute identifier into the attribute name 230 and the received non-hidden row condition into the non-hidden row condition 234. The database management system 152 further stores the received procedure identifier into the procedure identifier 206. Control then continues to block 499 where the logic of FIG. 4 returns.

Figure 5:
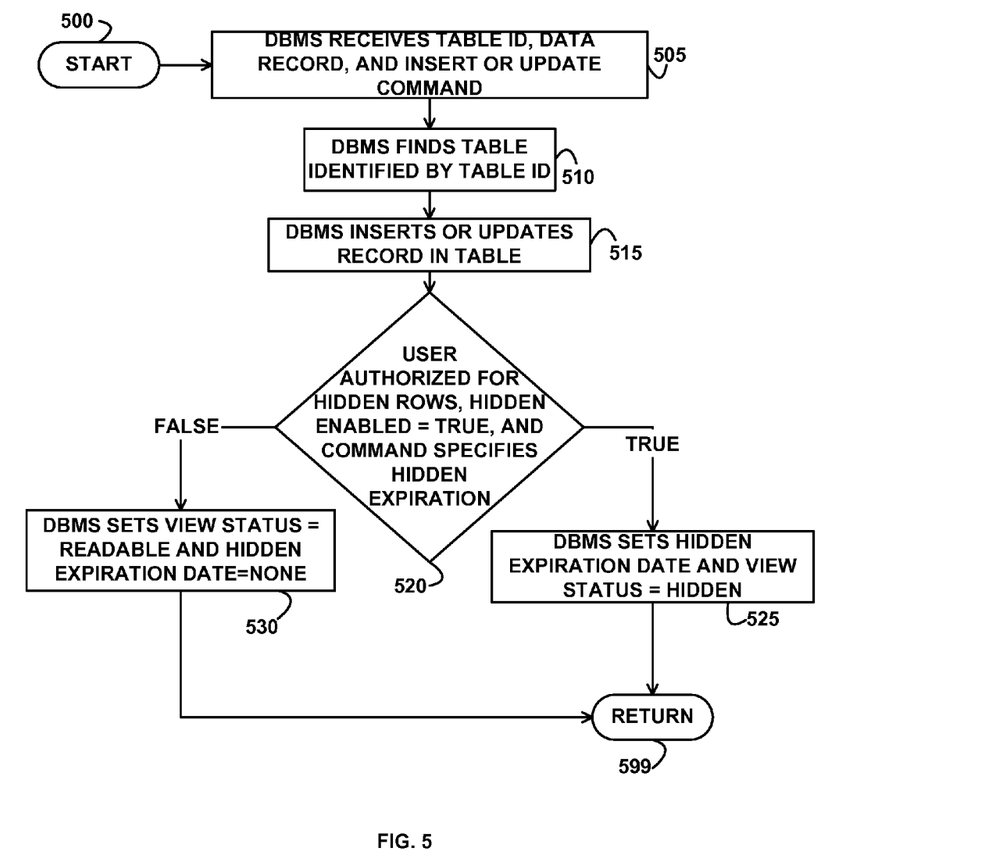
FIG. 5 depicts a flowchart of example processing for inserting/updating rows in a table, according to an embodiment of the invention.

FIG. 5 depicts a flowchart of example processing for inserting/updating rows in a table, according to an embodiment of the invention. Control begins at block 500. Control then continues to block 505 where the database management system 152 receives a command from a requestor, such as the application 156. The command is an insert or update command that specifies a table identifier that identifies a table and a data row or a key that identifies an existing data row in the table. Control then continues to block 510 where the database management system 152 finds the table identified by the received table identifier. Control then continues to block 515 where the database management system 152 inserts the received data row as a new row in the table identified by the received table identifier or updates the row identified by the key in the identified table with the received data row.

Control then continues to block 520 where the database management system 152 determines whether the user or the application that sent the command is authorized to access or add hidden rows, the hidden enabled field 205 in the table indicates true, and whether the received command specifies a hidden expiration date. If the determination at block 520 is true, then the user or the application that sent the command is authorized to access or add hidden rows, the hidden enabled field 205 in the table indicates true, and the received command specifies a hidden expiration date, so control continues to block 525 where the database management system 152 sets the received hidden expiration into the hidden expiration date 278 in the received or updated row and sets the view status 276 in the inserted or updated row to indicate that the row is hidden. Control then continues to block 599 where the logic of FIG. 5 returns.

If the determination at block 520 is false, then the user or the application that sent the command is not authorized to access or add hidden rows, the hidden enabled field 205 in the table indicates false, or the received command does not specify a hidden expiration date 278, so control continues to block 530 where the database management system 152 sets the hidden expiration date 278 in the received or updated row to indicate no expiration date and sets the view status 276 in the inserted or updated row to indicate that the row is not hidden and is viewable. Control then continues to block 599 where the logic of FIG. 5 returns.

The logic of FIG. 5 may be re-executed any number of times for any number of the same or different insert/update commands specifying the same or different table identifiers, data rows, and/or keys from the same or different applications.

Figure 6:
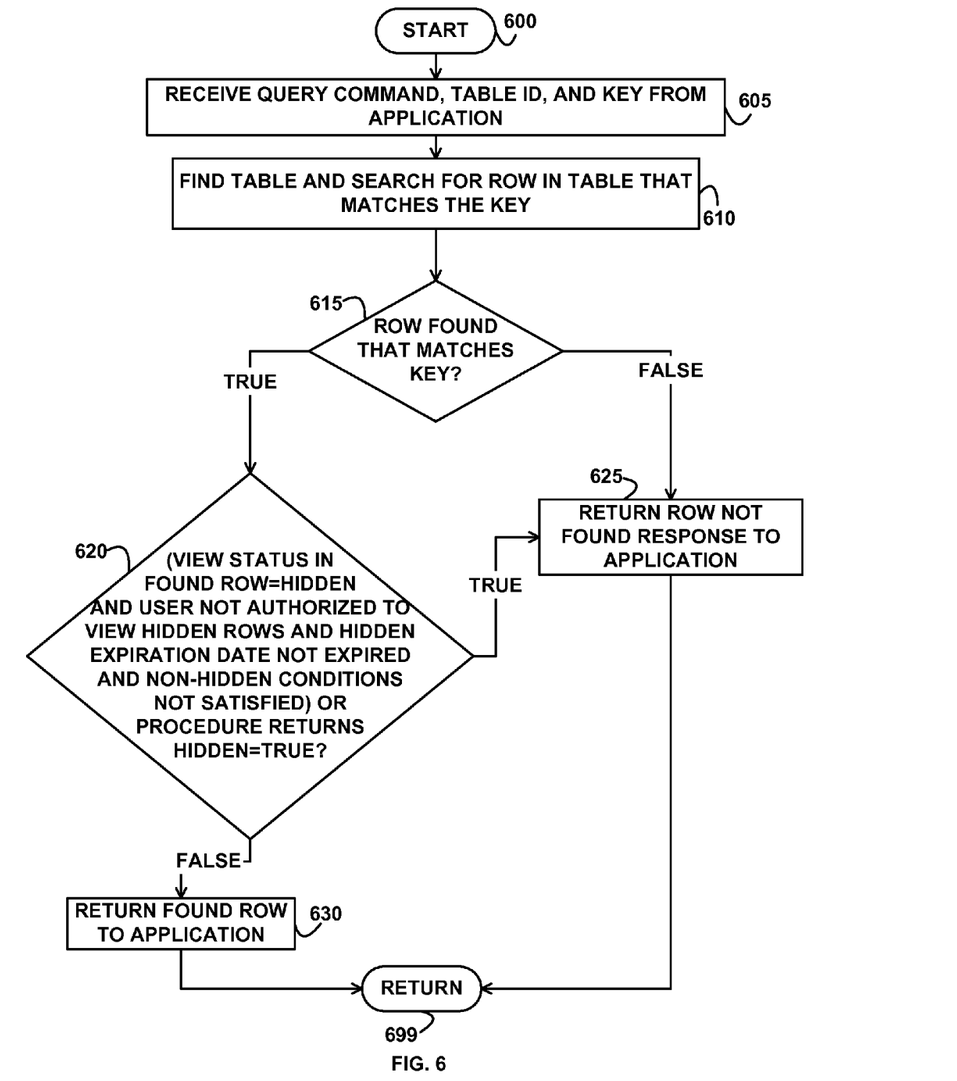
FIG. 6 depicts a flowchart of example processing for searching a table, according to an embodiment of the invention.

FIG. 6 depicts a flowchart of example processing for searching a table, according to an embodiment of the invention. Control begins at block 600. Control then continues to block 605 where the database management system 152 receives a query command from a requester, such as the application 156, which specifies a table identifier and a key. In various embodiments, the query command may be implemented as a read, find, or search command. Control then continues to block 610 where the database management system 152 finds the table identified by the received table identifier and searches for a row in the found table that matches the received key. That is, the database management system 152 searches for a row in the found table that comprises a data value in a column, where the data value matches (is identical to) the received data value of the key and the column identifier of the column in the found table matches the column identifier specified by the key.

Control then continues to block 615 where the database management system 152 determines whether the search of block 610 found a row in the found table that matches the received key. If the determination at block 615 is true, then the search found a row in the table identified by the received table identifier with a data value in a column that matches the data value and column specified by the received key, so control continues to block 620 where the database management system 152 determines whether the contents of the view status field 276 in the found row indicates that the found row is hidden and the user or application that send the query is not authorized to view hidden rows and the current date is not after the hidden expiration date 278 in the found row and the found row satisfies none of the non-hidden row conditions 234 in the table conditions 210 or an optional invocation of one of the procedures 158 specified by the procedure identifier 206 returns an indication that the row is hidden.

If the determination at block 620 is true, then the contents of the view status field 276 in the found row indicates that the found row is hidden and the user or application that send the query is not authorized to view hidden rows and the current date is not after the hidden expiration date 278 in the found row and the found row satisfies none of the non-hidden row conditions 234 in the table conditions 210 or an optional invocation of the procedure specified by the procedure identifier 206 returns an indication that the row is hidden, so control continues to block 625 where, in response to the query command, the database management system 152 returns, to the requesting application, an indication that the requested row was not found or does not exist in the specified table or database, despite the fact that a row does exist that matches the key. Control then continues to block 699 where the logic of FIG. 6 returns.

If the determination at block 620 is false, then the contents of the view status field 276 in the found row indicates that the found row is viewable or the user or application that send the query is authorized to view hidden rows or the current date is after the hidden expiration date 278 in the found row or the found row does satisfy at least one of the non-hidden row conditions 234 in the table conditions 210 and an optional invocation of the procedure specified by the procedure identifier 206 returns an indication that the row is viewable, so control continues to block 630 where, in response to the query command, the database management system 152 sends the found row to the application that requested the row via the received command. Control then continues to block 699 where the logic of FIG. 6 returns.

If the determination at block 615 is false, then the search did not find a row in the table identified by the received table identifier with a data value in a column that matches the data value and column specified by the received key, so control continues to block 625 where the database management system 152 returns, to the requesting application 156, an indication that the requested row was not found or does not exist in the specified table or database. Control then continues to block 699 where the logic of FIG. 6 returns.

The logic of FIG. 6 may be re-executed any number of times for any number of the same or different query commands specifying the same or different table identifiers and keys from the same or different applications.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of the stated features, integers, steps, operations, elements, and/or components, but do not preclude the presence or addition of one or more other features, integers, steps, operations, elements, components, and/or groups thereof.

In the previous detailed description of exemplary embodiments of the invention, reference was made to the accompanying drawings (where like numbers represent like elements), which form a part hereof, and in which is shown by way of illustration specific exemplary embodiments in which the invention may be practiced. These embodiments were described in sufficient detail to enable those skilled in the art to practice the invention, but other embodiments may be utilized and logical, mechanical, electrical, and other changes may be made without departing from the scope of the present invention. In the previous description, numerous specific details were set forth to provide a thorough understanding of embodiments of the invention. But, embodiments of the invention may be practiced without these specific details. In other instances, well-known circuits, structures, and techniques have not been shown in detail in order not to obscure embodiments of the invention.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure is not necessary. The previous detailed description is, therefore, not to be taken in a limiting sense, and the scope of the present invention is defined only by the appended claims.

What is claimed is:

1. A computer-implemented method comprising:
    storing a first row of data in a database;
    hiding the first row of data until a current date is later than a hidden expiration date, wherein the hiding the first row until the current date is later than the hidden expiration date further comprises returning, to a requestor, an indication that the first row does not exist in response to a query from the requestor that specifies a key that identifies the first row if the current date is before the hidden expiration date and returning, to the requestor, the first row in response to the query from the requestor that specifies the key that identifies the first row if the current date is after the hidden expiration date and a second row with a second key has been added to the database, wherein the hiding the first row until the current date is later than the hidden expiration date further comprises hiding the first row with a first key until the current date is later than the hidden expiration date and until the second row with the second key is added to the database, wherein the second key is specified in a non-hidden row condition in the database and wherein truth of the non-hidden row condition is evaluated;
    wherein the hiding the first row until the current date is later than the hidden expiration date further comprises hiding the first row with a first key until the current date is later than the hidden expiration date if another row with another key is preexisting in the database prior to the storing the first row of data in the database; and
    wherein the hiding the first row until the current date is later than the hidden expiration date further comprises hiding the first row until the current date is later than the hidden expiration date and a number of a plurality of rows with a first key are added before a first date.

2. The method of claim 1, further comprising:
    performing the storing the first row in response to a request that specifies the hidden expiration date.

3. The method of claim 1, wherein the hiding the first row until the current date is later than the hidden expiration date further comprises:
    if the number of the plurality of rows are not added before the first date, then changing the first date to a second date that is later than the second date and hiding the first row until the current date is later than the hidden expiration date and the number of a plurality of rows with the first key are added before the second date.

4. The method of claim 1, further comprising:
storing the hidden expiration date in the first row.

5. The method of claim 1, further comprising:
storing a view status in the first row that indicates whether the first row is hidden.

6. A computer-readable storage medium encoded with instructions, wherein the instructions when executed comprise:
storing a first row of data in a database;
hiding the first row of data until a current date is later than a hidden expiration date, wherein the hiding the first row until the current date is later than the hidden expiration date further comprises returning, to a requestor, an indication that the first row does not exist in response to a query from the requestor that specifies a key that identifies the first row if the current date is before the hidden expiration date and returning, to the requestor, the first row in response to the query from the requestor that specifies the key that identifies the first row if the current date is after the hidden expiration date and a second row with a second key has been added to the database, wherein the hiding the first row until the current date is later than the hidden expiration date further comprises hiding the first row with a first key until the current date is later than the hidden expiration date and until the second row with the second key is added to the database, wherein the second key is specified in a non-hidden row condition in the database and wherein truth of the non-hidden row condition is evaluated;
wherein the hiding the first row until the current date is later than the hidden expiration date further comprises hiding the first row with a first key until the current date is later than the hidden expiration date if another row with another key is preexisting in the database prior to the storing the first row of data in the database; and
wherein the hiding the first row until the current date is later than the hidden expiration date further comprises hiding the first row until the current date is later than the hidden expiration date and a number of a plurality of rows with a first key are added before a first date.

7. The computer-readable storage medium of claim 6, wherein the hiding the first row until the current date is later than the hidden expiration date further comprises:
if the number of the plurality of rows are not added before the first date, then changing the first date to a second date that is later than the second date and hiding the first row until the current date is later than the hidden expiration date and the number of a plurality of rows with the first key are added before the second date.

8. The computer-readable storage medium of claim 6, further comprising:
storing the hidden expiration date in the first row.

9. The computer-readable storage medium of claim 6, further comprising:
storing a view status in the first row that indicates whether the first row is hidden.

10. A computer system, comprising:
a processor; and
memory communicatively coupled to the processor, wherein the memory is encoded with instructions that when executed on the processor comprise:
storing a first row of data in a database,
hiding the first row of data until a current date is later than a hidden expiration date, wherein the hiding the first row until the current date is later than the hidden expiration date further comprises returning, to a requestor, an indication that the first row does not exist in response to a query from the requestor that specifies a key that identifies the first row if the current date is before the hidden expiration date and returning, to the requestor, the first row in response to the query from the requestor that specifies the key that identifies the first row if the current date is after the hidden expiration date and a second row with a second key has been added to the database, wherein the hiding the first row until the current date is later than the hidden expiration date further comprises hiding the first row with a first key until the current date is later than the hidden expiration date and until the second row with the second key is added to the database, wherein the second key is specified in a non-hidden row condition in the database and wherein truth of the non-hidden row condition is evaluated,
storing the hidden expiration date in the first row,
storing a view status in the first row that indicates whether the first row is hidden,
wherein the hiding the first row until the current date is later than the hidden expiration date further comprises hiding the first row with a first key until the current date is later than the hidden expiration date if another row with another key is preexisting in the database prior to the storing the first row of data in the database; and
wherein the hiding the first row until the current date is later than the hidden expiration date further comprises hiding the first row until the current date is later than the hidden expiration date and a number of plurality of rows with a first key are added before a first date.

11. The computer system of claim 10, wherein the hiding the first row until the current date is later than the hidden expiration date further comprises:
if the number of the plurality of rows are not added before the first date, then changing the first date to a second date that is later than the second date and hiding the first row until the current date is later than the hidden expiration date and the number of a plurality of rows with the first key are added before the second date.

* * * * *